US012556797B1

(12) United States Patent
Perillo et al.

(10) Patent No.: US 12,556,797 B1
(45) Date of Patent: Feb. 17, 2026

(54) TIME DELAYED COORDINATED ILLUMINATION SYSTEM

(71) Applicant: AMAZON TECHNOLOGIES, INC., Seattle, WA (US)

(72) Inventors: Evan Perillo, Woodinville, WA (US); Kyle Ryan Lashbrook, Seattle, WA (US); Tej Harshad Patel, Seattle, WA (US); Yufei Jia, Seattle, WA (US); Baomin Wang, Pleasant Gap, PA (US); Brendan Pratt, Newtown, CT (US); Abhinav Kashyap, Redmond, WA (US); Connor Lang, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 109 days.

(21) Appl. No.: 18/538,417

(22) Filed: Dec. 13, 2023

(51) Int. Cl.
| | | |
|---|---|---|
| *G03B 15/00* | (2021.01) | |
| *G03B 9/28* | (2021.01) | |
| *G03B 15/02* | (2021.01) | |
| *H04N 23/11* | (2023.01) | |
| *H04N 23/56* | (2023.01) | |
| *H04N 23/69* | (2023.01) | |
| *H05B 47/105* | (2020.01) | |
| *H05B 47/165* | (2020.01) | |

(52) U.S. Cl.
CPC ............... *H04N 23/56* (2023.01); *G03B 9/28* (2013.01); *G03B 15/02* (2013.01); *H04N 23/11* (2023.01); *H04N 23/69* (2023.01); *H05B 47/105* (2020.01); *H05B 47/165* (2020.01)

(58) Field of Classification Search
CPC ........ H04N 23/56; H04N 23/11; H04N 23/69; G03B 9/28; G03B 15/02; H05B 47/105; H05B 47/165
See application file for complete search history.

(56) References Cited

U.S. PATENT DOCUMENTS

| | | | | |
|---|---|---|---|---|
| 5,059,796 A | * | 10/1991 | Nakamura | G08B 13/194 250/342 |
| 6,011,901 A | * | 1/2000 | Kirsten | H04N 7/181 348/E7.086 |
| 6,532,038 B1 | * | 3/2003 | Haring | B61L 23/041 348/148 |

(Continued)

FOREIGN PATENT DOCUMENTS

EP 1585083 A2 * 10/2005 ............... B60T 7/22

*Primary Examiner* — Frank F Huang
(74) *Attorney, Agent, or Firm* — Lindauer Law, PLLC

(57) ABSTRACT

An input device uses banks of spatially separated light sources to selectively illuminate a field of view to acquire input image data used for biometric identification. In one implementation a plurality of banks of light sources are arranged from a first end to a second end of a device. Each bank may comprise light sources that are arranged on both sides of a device centerline. A camera with a rolling shutter acquires rows of image data beginning at the first end and scanning to the second end. While the camera is operating, banks of lights are progressively activated in coordination with the rolling shutter to illuminate a portion of a field of view and an object within, such as a hand, being imaged. This results in high-contrast input image data that is well illuminated, while reducing overall power requirements. The input image data may then be processed for identification.

20 Claims, 6 Drawing Sheets

(56) References Cited

U.S. PATENT DOCUMENTS

| | | | |
|---|---|---|---|
| 2004/0030476 A1* | 2/2004 | Oswald | B60R 21/013 701/45 |
| 2007/0222566 A1* | 9/2007 | Tsuji | G06V 20/56 348/148 |
| 2009/0174573 A1* | 7/2009 | Smith | G08G 1/0962 340/905 |
| 2009/0216390 A1* | 8/2009 | Smith | H04L 67/12 701/2 |
| 2010/0208075 A1* | 8/2010 | Katsuno | B60Q 9/005 348/148 |
| 2011/0140919 A1* | 6/2011 | Hara | B60Q 1/507 340/907 |
| 2012/0226394 A1* | 9/2012 | Marcus | A62B 5/00 701/2 |
| 2015/0211870 A1* | 7/2015 | Nickolaou | G08G 1/166 701/28 |

* cited by examiner

TIME DELAYED COORDINATED ILLUMINATION SYSTEM

BACKGROUND

Facilities such as stores, libraries, hospitals, offices, apartments, and so forth, may need the ability to identify users at the facility or acquire other input.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
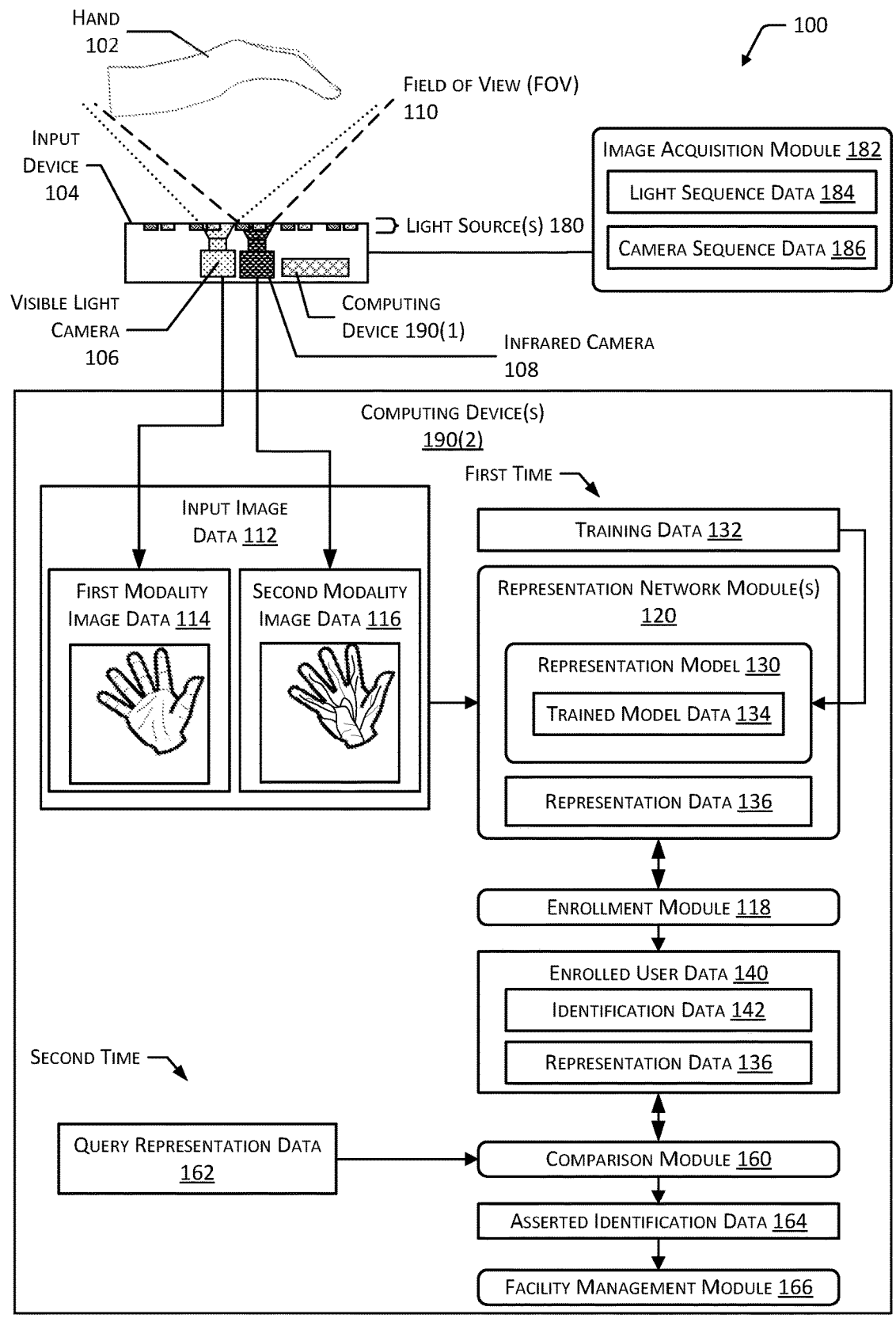
FIG. 1 illustrates a system including an input device providing time delayed coordinated illumination, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Accurate and fast acquisition of biometric input by an input device may be used in a variety of ways including determining if physical access is permitted, determining a payment method to be used, and so forth. In one implementation, biometric input may be used to control physical access to a facility or portion thereof. For example, entrance to an office, residence, warehouse, transportation facility, or other location, may be responsive to a user presenting biometric input at an entry portal. In another implementation, biometric input may be used to facilitate payment for goods or services. For example, an input device may be used at a point-of-sale (POS). Biometric input may be obtained and used to determine an identity of the user. The identity of the user may then be associated with a payment method, such as an account, previously stored bank or credit card account, and so forth. Other operations may also be facilitated by the input device. For example, a user may use the input device to associate an account indicated by an EMV card with their biometric input. In yet another implementation the input device may use a multifactor authentication approach based on biometric input as well as a physical token, such as a smart card that is in the possession of the user. Such multifactor authentication may be used to sign an electronic record. For example, the combination of biometric input and the physical token may be used to provide information as to the particular user who agreed to a contract, accepted a delivery, and so forth.

Traditional systems for identifying users suffer from several significant drawbacks including susceptibility to presentation attacks, lack of speed, inaccuracy, and operational limitations. Biometric identification systems identify users based on a characteristic of the particular individual that is difficult or impossible to copy or be transferred. Operation of traditional biometric identification systems introduce operational problems such as slow data acquisition, limited resolution, increased wear in heavy-use environments, and so forth. For example, traditional palm-based biometric identification systems require physical contact between the user's hand and a scanning device. This physical contact may be deemed unsanitary and may be difficult to accomplish for some users.

Simultaneous illumination of an object, such as a hand, by light sources at different positions may result in phase shifts of the incident light at the image sensor that produces interference. This interference may interfere with the quality of the acquired image, such as decreasing the contrast of the image.

Described in this disclosure is an input device that implements time delayed illumination that is coordinated with operation of a camera comprising a rolling shutter in conjunction with an image sensor to acquire biometric input comprising input image data. The rolling shutter may comprise an electronic or mechanical rolling shutter. For example, an electronic rolling shutter comprises progressive readout of different rows of pixels in the image sensor as time progresses. The input device comprises banks of spatially separated light sources that are operated to selectively illuminate a field of view of a camera. The banks of light sources are operated so their emitted light illuminates the portions of the FOV that are imaged by the respective rows of the image sensor.

In one implementation a plurality of banks of light sources are arranged from a first end to a second end of a device. Each bank may comprise light sources that are arranged on both sides of a device centerline. The camera may be located along the centerline and between the first end and the second end.

Compared to simultaneous illumination, the resulting input image data that is acquired exhibits substantially improved contrast. This improves visibility of features in the image that may be useful for biometric identification. The time delayed coordinated illumination also improves the uniformity in the intensity of illumination compared to simultaneous illumination by preventing over-illumination from adjacent lights. This substantially reduces or eliminates "bright spots" or over-illuminated areas in the image, further improving the quality of the image and improving the visibility of features in the image that may be useful for biometric identification.

The time delayed coordinated illumination may result in a reduction of power consumption, compared to simultaneous illumination. For example, instead of five banks of lights operating during image acquisition using simultaneous illumination, at any given time one out of the five banks may be operating during image acquisition.

The time delayed coordinated illumination may improve operation during high ambient background light conditions, such as operation in sunlight. For example, given the short duration of operation of a bank of lights and the power reduction mentioned above, a given bank may be driven at maximum intensity to provide suitable lighting of the hand against a well lit background.

The input image data may comprise images that may be used for non-contact biometric identification of users. The input device may include a distance sensor, such as an optical time-of-flight sensor. When the distance sensor detects a presence of an object, one or more operations may be performed by the device.

The device may include a visible light camera. In one implementation, the visible light camera may be used to acquire visible light image data of the hand within the visible light camera's field of view (FOV) and illuminated using the time delayed illumination sequence. The visible light image data may also be used to determine information about the pose of the hand. This information may be used to provide feedback to the user, directing them to modify the pose of their hand to attain a pose that is suitable for identification.

The device may comprise an infrared camera having a FOV illuminated using the time delayed illumination sequence. In one implementation, polarized infrared light sources in the device may be activated at different times to provide illumination while an infrared camera in the device that is sensitive to infrared light acquires images at the different times. The images are of objects within the infrared camera's FOV and as illuminated by infrared light with different polarizations at different times. For example, a first set of one or more images may be obtained that use infrared light with a first polarization and a second set of one or more images that use infrared light with a second polarization may be obtained. The infrared camera may include a polarizer with the first polarization. The first set of images depict external characteristics, such as lines and creases in the user's palm while the second set of images depict internal anatomical structures, such as veins, bones, soft tissue, or other structures beneath the epidermis of the skin.

The input image data may then be processed to determine information indicative of features in the images. In one implementation the input image data may be processed at least in part locally on the device. In another implementation the input image data, or data based on the input image data, may be encrypted and transmitted to a server for processing to determine identity, payment account information, authorization to pass through a portal, and so forth.

By using the devices and techniques described in this disclosure, input image data with improved image quality such as improved contrast and illumination uniformity may be acquired. The improved image quality results in improved input for subsequent processing, improving the overall speed and accuracy of biometric identification using the input image data. The biometric identification may then be used to determine the physical presence of a particular user at the particular input device at a particular time. This information may be used to authorize payment of a transaction, gain entry to a secured area, sign a contract, and so forth.

Illustrative System

FIG. 1 illustrates a system 100 including an input device 104 providing time delayed coordinated illumination, according to some implementations. The system 100 is described performing biometric identification that asserts an identity of a user at an input device 104. However, the system and techniques described herein may be used in other situations.

A hand 102 of a user is depicted positioned above an input device 104. The input device 104 may include a computing device 190(1) and one or more of a visible light camera 106 sensitive to visible light or an infrared camera 108 sensitive to infrared light. Each camera has a respective field of view (FOV) 110. During operation of the input device 104, one or more of the cameras 106 or 108 acquire images of an object in the respective FOV 110, such as the hand 102, and provides input image data 112. In other implementations other cameras may be used that are sensitive to other wavelengths, such as ultraviolet light. The input device 104 includes one or more light sources 180 that illuminate the object in the FOV 110.

During image acquisition, the cameras utilize a rolling shutter. The rolling shutter may comprise an electronic rolling shutter or a mechanical rolling shutter. For example, an electronic rolling shutter comprises progressive readout of different rows of pixels in the image sensor as time progresses. In another example, a mechanical rolling shutter may comprise a moving shutter with a slit that moves across the imaging sensor during image acquisition. The rolling shutter is discussed in more detail with regard to FIG. 3.

The input device 104 comprises banks of spatially separated light sources 180 that are operated to selectively illuminate the camera FOV 110. During operation, the light sources 180 emit light at a plurality of wavelengths. For example, a first light source 180(1) may emit white light and a second light source 180(2) may emit infrared light. The light sources 180 may be spatially distributed along the device. For example, a first visible light source 180(1)(1) may be located proximate to a first end while a second visible light source 180(1)(2) is proximate to a second end. Light sources 180 may be grouped into banks. For example, a pair of visible light sources 180(1) proximate to the first end may be grouped into a first bank, while a pair of visible light sources 180(1) proximate to the second end are grouped into a second bank. The banks of light sources 180 are operated by an image acquisition module 182 so their emitted light illuminates the portions of the FOV 110 that are imaged by the respective rows of the image sensor resulting from the operation of the rolling shutter of the camera.

The image acquisition module 182 may control the operation of banks of light sources 180 according to light sequence data 184. The light sequence data 184 may specify a particular order of operation of respective banks of light sources 180 in coordination with operation of one or more cameras and other parameters associated with operation of those light sources. Operation of the image acquisition module 182 and the light sequence data 184 is discussed in more detail with regard to FIG. 5.

The image acquisition module 182 may also operate based on camera sequence data 186. The camera sequence data 186 may indicate the order in which one or more cameras operate. For example, the camera sequence data 186 may specify the visible light camera 106 operates at a first time, followed by the infrared camera 108 at a second time.

The input device 104 may include other components which are not shown in FIG. 1. For example, the input device 104 may include a distance sensor, tamper detection devices, and so forth. These and other components are discussed with regard to FIG. 6.

In the implementation depicted, the hand 102 is held above the camera, with the FOV 110 extending upward. In other implementations, other configurations may be used. For example, the camera may have the FOV 110 extending downwards, and the user may place their hand 102 in the FOV 110 under the input device 104.

In one implementation, the input device 104 is configured to acquire images of the hand 102 that are illuminated using infrared light source(s) 180 that have two or more particular polarizations, with different illumination patterns, and so forth. For example, during operation the user may present their hand 102 with the palm or volar region of the hand toward the input device 104. As a result, the input image data 112 provides an image of the anterior portion of the hand 102. In other implementations, the input image data 112 may include the back of the hand 102. Separate images may be acquired using different combinations of polarized light provided by the infrared light sources 180.

Depending upon the polarization used, the images produced by the input device 104 may be of first modality features or second modality features. The first modality may utilize images in which the hand 102 is illuminated with light having a first polarization and obtained by a camera such as the infrared camera 108 with a polarizer passing light to the camera 108 that also has the first polarization. First modality features may comprise features that are close to, or on, a surface of the hand 102 of the user. For example, the first modality features may include surface features such as creases, wrinkles, scars, dermal papillae ridges, and so forth in at least the epidermis of the hand 102. Images acquired using the first modality may be associated with one or more surface features.

Second modality features comprise those features that are below the epidermis. The second modality may utilize images in which the hand 102 is illuminated with light having a second polarization and obtained by a camera such as the infrared camera 108 with the polarizer passing light to the camera 108 with the first polarization. For example, the second modality features may include subcutaneous anatomical structures such as veins, bones, soft tissue, and so forth. Some features may be visible in both first modality and second modality images. For example, a crease in the palm may include first modality features on the surface as well as deeper second modality features within the palm. Images acquired using the second modality may be associated with one or more subcutaneous features.

Separate images of the first and second modalities may be acquired using different combinations of polarized light provided by the infrared light sources 180. In this illustration, the input image data 112 comprises first modality image data 114 and second modality image data 116. The first modality image data 114 and the second modality image data 116 of the same object may be acquired in rapid succession with respect to one another. For example, the camera may operate at 60 frames per second and acquire the first modality image data 114 in a first frame and the second modality image data 116 in a second frame.

In the implementation depicted here, the input device 104 does not include a guide, scan plate, or other structure that constrains the pose or position of the hand 102. The omission of the guide may improve sanitary operation of the system. For example, by removing the guide, the user's hand 102 does not come into physical contact with a structure, eliminating the possibility of contact transmission of contaminants, disease, and so forth. By removing the physical contact, the need for surface cleaning of the guide between users may be eliminated.

In another implementation, the input device 104 may include a structure such as a guide or scan plate to constrain at least some movement of the hand 102. For example, the scan plate may comprise a flat pane of glass which the hand 102 may rest upon, and the camera may then acquire an image.

In the implementation depicted here, the input device 104 does not include a hood, cover, or other structure that blocks at least a portion of the ambient light from reaching one or more of the cameras. The omission of the hood may improve usability and accessibility of the system by users. For example, by omitting the hood, the user's hand 102 may be moved in any direction with respect to the input device 104 to bring the hand 102 into the FOV 110. In contrast, a hood and associated support structure would limit the directions, relative to the input device 104, that the user may present their hand 102. By utilizing the techniques and hardware described in this disclosure, the input device 104 may be used in locations such as outdoors, indoors within areas that are exposed to sunlight such as near windows, in the presence of high intensity artificial illumination, and so forth. The system is also able to provide intensity data in the presence of ambient lighting with different color temperatures.

Users are able to utilize the system 100 by performing an enrollment process. An enrollment module 118 may coordinate the enrollment process. Enrollment may associate biometric information, such as representation data 136 or transformed representation data, with particular information such as a name, account number, and so forth.

During an enrollment process, the user opts in and presents their hand 102 to the input device 104. The image acquisition module 182 of the input device 104 may then coordinate the operation of the light sources 180 and the cameras to provide input image data 112 to a computing device 190(2) executing a representation network module 120.

The representation network module 120 may comprise a neural network implementing one or more representation models 130 ("representation model") that accepts as input the input image data 112 and provides as output representation data 136. The representation model 130 comprises a machine learning network ("network") that is trained to determine representation data 136 based on input image data 112. The network may comprise a convolutional neural network, deep learning network, or other network architecture. The representation data 136 is representative of at least some of the features depicted in the input image data 112. In some implementations, the representation data 136 may comprise a vector value in an embedding space.

In some implementations, the computing device 190(1) of the input device 104 may include and may execute the (trained) representation network module(s) 120. In another implementation, the input device 104 may encrypt and send the input image data 112 or data based thereon, to another computing device 190(2) such as a server.

During the enrollment process, the submitted representation data 136 may be checked to determine whether the user has been previously enrolled. A successful enrollment may comprise storage of identification data 142, such as name, telephone number, account number, and so forth and storage of one or more of the representation data 136 or the transformed representation data as enrolled user data 140. In some implementations, the enrolled user data 140 may comprise additional information associated with processing of the input image data 112 with a representation model 130. For example, the enrolled user data 140 may comprise intermediate layer data, such as the values of a penultimate layer of the representation model 130.

In this illustration, at a first time the representation model 130 is trained using training data 132 to determine trained model data 134. The training data 132 may comprise a plurality of first modality and second modality images that have been labeled. For example, label data may indicate the sample identifier, identity label, modality label, and so forth.

During subsequent usage, such as at a second time, the (as yet unidentified) user presents their hand 102 at an input device 104. As described above with regard to enrollment, the input device 104 acquires query input image data 112. The resulting query input image data 112 may be processed by the (now trained) representation model 130 to determine query representation data 162.

A comparison module 160 compares the query representation data 162 to the representation data 136 stored in the enrolled user data 140 to determine asserted identification data 164. In one implementation, the asserted identification data 164 may comprise a user identifier associated with the closest previously stored representation data 136 in the enrolled user data 140 to the query representation data 162 associated with the user who presented their hand 102. The comparison module 160 may utilize other considerations, such as requiring that the query representation data 162 is no more than a maximum distance in the representation space from the representation data 136 of a particular user before determining the asserted identification data 164.

The asserted identification data 164 may then be used by subsequent systems or modules. For example, if the input image data 112 is associated with asserted identification data 164, the asserted identification data 164 or information based thereon, may be provided to a facility management module 166.

The facility management module 166 may use the asserted identification data 164 to associate an identity with that user as they move about the facility. For example, the facility management module 166 may use data from cameras or other sensors in the environment to determine a location of the user. Given a known path of the user from an entrance that utilizes the input device 104, the user identity indicated in the identification data 142 may be associated with the user as they use the facility. For example, the now identified user may walk to a shelf, remove an item, and leave the facility. The facility management module 166 may determine interaction data indicative of the removal of the item as being associated with the user identifier specified in the asserted identification data 164, and bill an account associated with the user identifier. In another implementation, the facility management module 166 may comprise a point of sale system. The user may present their hand 102 at checkout to assert their identity and pay using a payment account that is associated with their identity.

The systems and techniques described above are discussed with respect to images of human hands. These systems and techniques may be used with respect to other forms of data, other kinds of objects, and so forth. For example, these techniques may be used for facial recognition systems, object recognition systems, and so forth.

Figure 2:
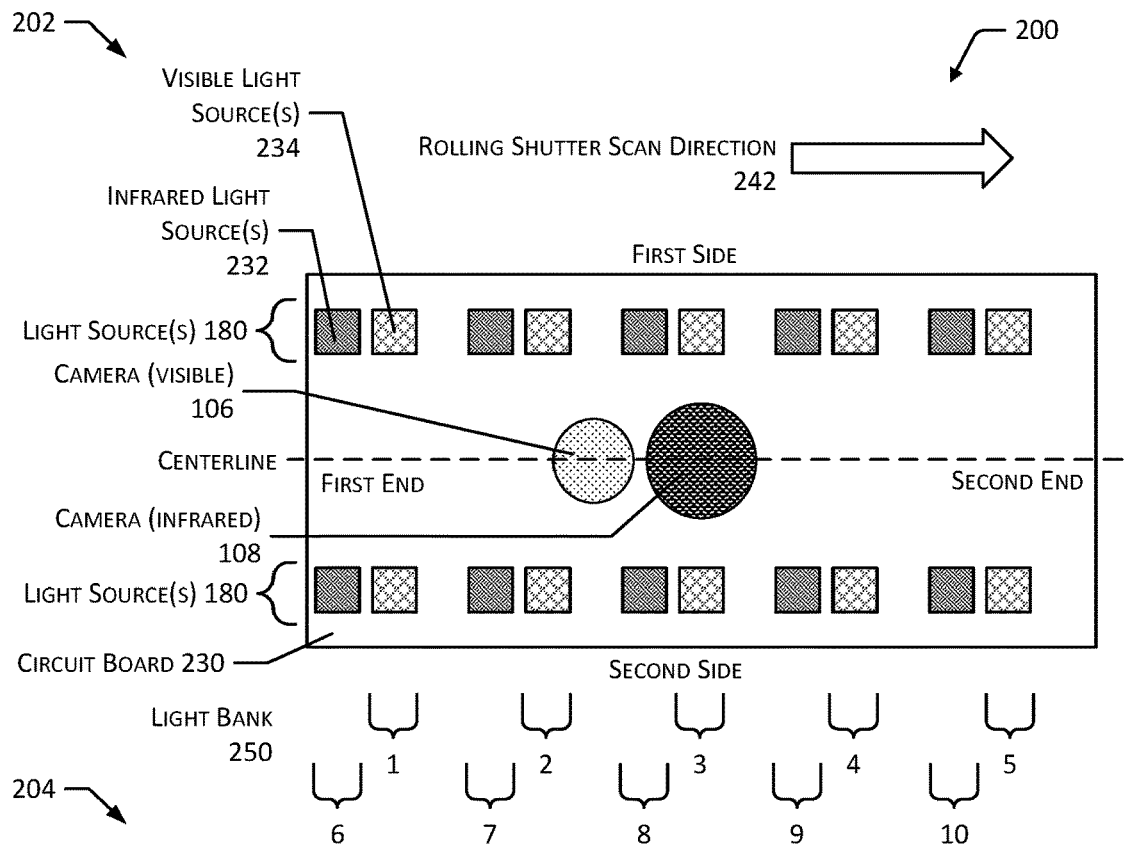
FIG. 2 illustrates a portion of the input device with banks of light sources that are operated in a coordinated sequence during image acquisition with a camera using a rolling shutter, according to some implementations.
Figure 2:
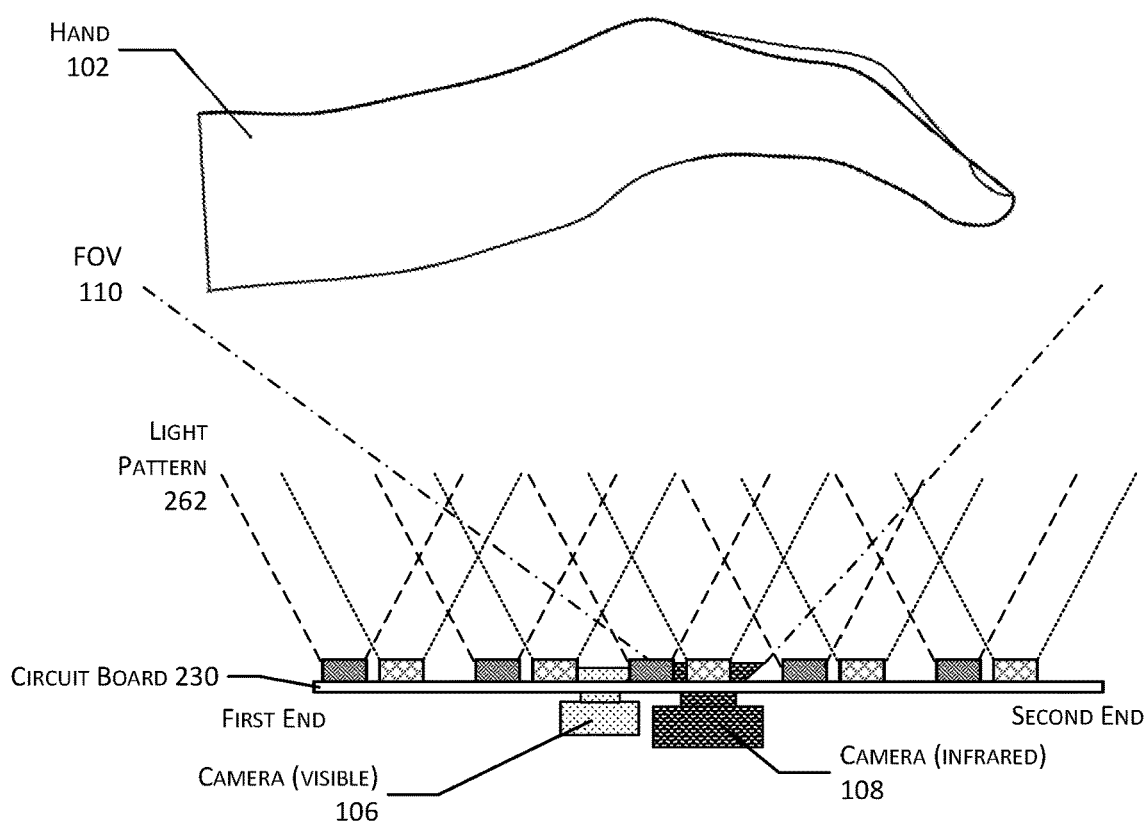

FIG. 2 illustrates at 200 a portion of the input device 104 with banks of light sources 180 that are operated in a coordinated fashion during image acquisition with a camera using a rolling shutter, according to some implementations. The portion of the input device 104 is depicted in a plan view 202 and a side view 204.

A circuit board 230 having a first end and a second end is depicted. Also shown is a centerline of the circuit board 230. The visible light camera 106 and the infrared camera 108 may be positioned as shown, along the centerline and positioned within a center one-third of the circuit board 230 between the first end and the second end. The cameras may be mounted to the circuit board 230, or pass through holes in the circuit board 230.

The one or more light sources 180 emit light during operation. For example, the light sources 180 may comprise light emitting diodes (LEDs), quantum dots, electroluminescent devices, fluorescent devices, lamps, vertical-cavity surface-emitting lasers (VCSELs), and so forth. The light sources 180 may be arranged to provide illumination of an object within the FOV 110. In this illustration, pairs of light sources 180 are arranged on either side of the centerline, forming rows extending from the first end to the second end.

The light sources 180 may comprise different devices, each with different emitted light characteristics such as emitted wavelengths. The light sources 180 may comprise one or more of infrared light sources 232 to emit infrared light, visible light sources 234 to emit visible light, ultraviolet light sources (not shown) to emit ultraviolet light, and so forth. The infrared light sources 232 emit infrared light, such as light with a wavelength of 940 nm. The visible light sources 234 may comprise one or more of a white light source, a violet light source, or other colors of light sources.

Some of the light sources 180 may be monochromatic or may emit light within a relatively narrow band of wavelengths such as 10 nm. For ease of discussion, and not necessarily as a limitation, unless otherwise specified, a wavelength may include either a single wavelength or a range of wavelengths. For example, a VCSEL described as emitting light with a wavelength of 940 nm may emit infrared light between 935 nm and 945 nm, with a peak intensity at 940 nm.

Some light sources 180 may be relatively broadband, such as the visible light sources 234 that emit white light. Broadband light sources 180 may comprise relatively broadband devices, such as incandescent filament, or may comprise several different devices that emit narrower bandwidths, such as a combination of red, green, and blue LEDS. White light may comprise light with a color temperature of 5000 degrees Kelvin and comprise visible light wavelengths and having relative intensities at wavelengths therein that are perceived by the human eye as being white.

In some implementations, a diffuser (not shown) may be emplaced that diffuses light emitted by the light source 180. A light pipe or other waveguide may be emplaced that directs light from the light source 180 toward the FOV 110. For example, the light pipe or other structure may be used to provide a desired distribution of intensity across the FOV 110.

In some implementations, a polarizer (not shown) may be emplaced that filters light emitted by one or more of the light sources 180, received by a camera, or both. A polarizer having the same or a different polarization relative to the light sources 180 may be emplaced that filters light before impingement on the camera, such as the infrared camera 108. As described with regard to the different modalities, different combinations of polarization may be used to assess light reflected predominately from a surface of the object, or from deeper within the object.

In the implementation depicted, light sources 180 are arranged in rows on either side of and paralleling the centerline. The light sources 180 are depicted as approximately evenly distributed between the first end and the second end. In other implementations, other arrangements may be used. For example, the light sources 180 may be arranged along the centerline, and light bending films or other optical elements may be used to provide illumination that disperses to either side of the centerline. Some variation in the relative distance between adjacent banks may be tolerated.

In the implementation shown, the infrared light sources 232 and visible light sources 234 alternate from the first end to the second end. For example, at the first end a first infrared light source 232(1) is depicted, then a first visible light source 234(1), then a second infrared light source 232(2), then a second visible light source 234(2), and so on until the second end.

In the implementation depicted, two or more light sources 180 on opposite sides of the centerline are grouped into light banks 250. For example, a pair of visible light sources 234 proximate to the first end and on opposite sides of the centerline may be deemed light bank 250(1). The next pair of visible light sources 234 towards the second end may be deemed light bank 250(2), and so on. Continuing the example, a pair of infrared light sources 232 proximate to the first end and on opposite sides of the centerline may be deemed light bank 250(6). The next pair of infrared light sources 232 towards the second end may be deemed light bank 250(7), and so on.

Also depicted in this figure is a rolling shutter scan direction 242 that begins at the first end and proceeds to the second end. The rolling shutter scan direction 242 is representative of the portion of the FOV 110 that is exposed to an image sensor of the camera during operation. The rolling shutter is discussed in more detail with regard to FIG. 3.

During operation, the image acquisition module 182 may operate the light banks 250 to operate in a coordinated fashion, illuminating the FOV 110 beginning at the first end and progressing to the second end along the direction of the rolling shutter scan direction 242.

The side view 204 depicts the light pattern(s) 262 produced by light sources 180 during their respective operation. Each light bank 250 and its corresponding light pattern 262 illuminates different portions of the FOV 110. For ease of illustration and not necessarily as a limitation, the light patterns 262 from the various light sources 180 are depicted as approximately the same angular size. In other implementations, different light sources 180 may have different light patterns 262.

In other implementations other mechanisms may be used to provide illumination of the FOV 110 that progresses with the rolling shutter scan direction 242. For example, instead of individual light sources 180, one or more scanning mirrors or digital light projectors may be used to provide illumination from different locations.

Figure 3:
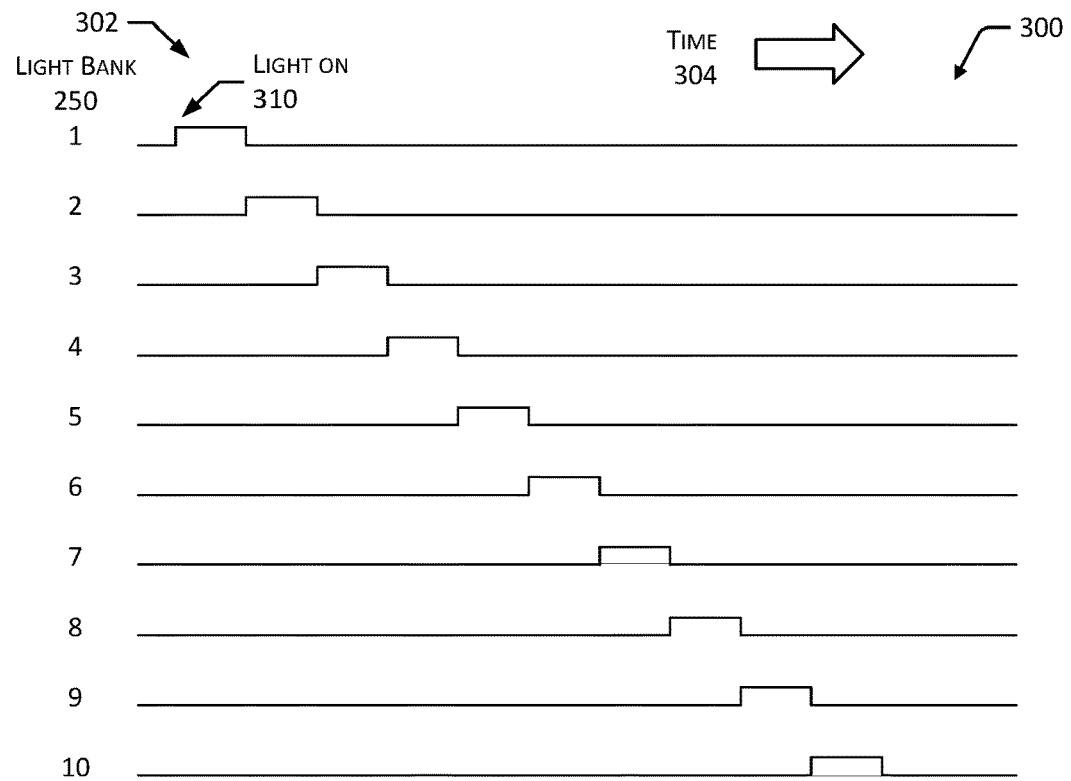
FIG. 3 illustrates timing of operation of the banks of light sources and the rolling shutter to acquire input image data.
Figure 3:
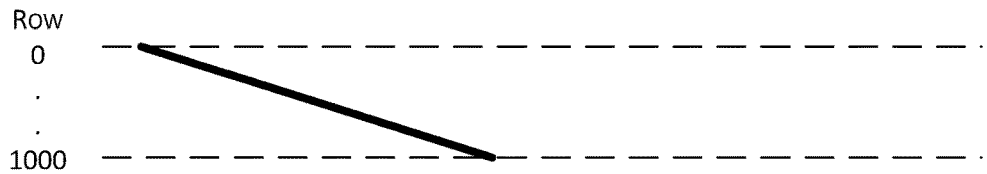
Figure 3:
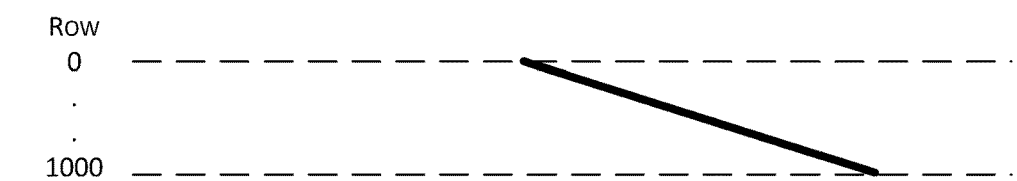
Figure 3:
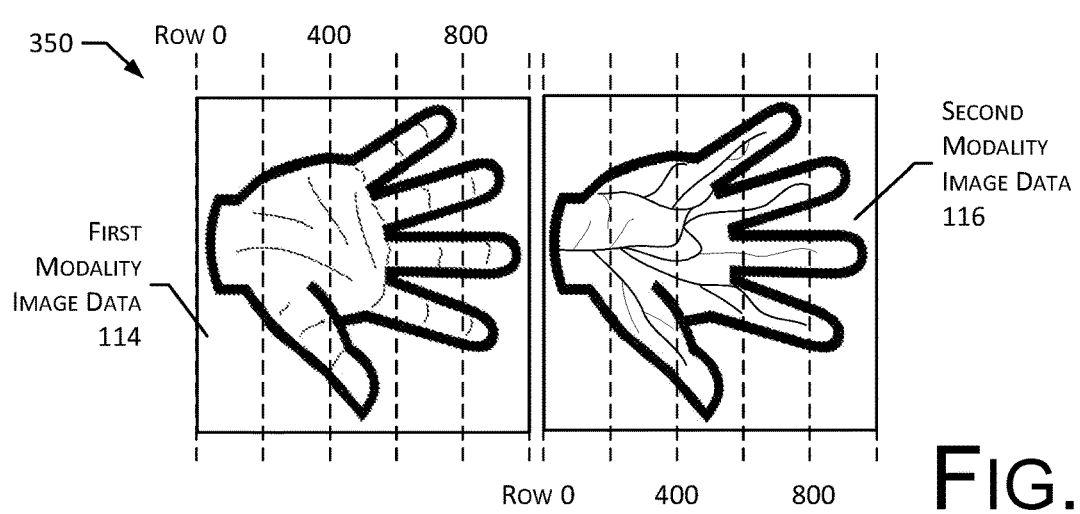

FIG. 3 illustrates at 300 timing of operation of the light banks 250 of light sources 180 and the rolling shutter to acquire input image data 112. In this illustration, time 304 increases generally from left to right on the page.

A light timing diagram 302 depicts operation of respective light banks 250 at different times. In this timing diagram 302, the condition of a given light bank 250 being operational to emit light is shown as light on 310.

In the implementation shown by the light timing diagram 302, only one light bank 250 is in operation at a time. The order of operation of the respective light banks 250 is progressive, with one light bank 250 in operation, followed at a next time by operation of an adjacent light bank 250, and so forth. In other implementations more than one light bank 250 may be operational at the same time. For example, a profile or time varied increase and decrease of intensity may be used, resulting in two or more light banks 250 being operated at the same time to emit light.

A visible light camera rolling shutter 330 timing depicts operation of a rolling shutter of the visible light camera 106. Depicted are the rows 0 to 1000 for an image sensor of the visible light camera 106. The image sensor is depicted with 1000 rows for ease of illustration and not as a limitation. For example, the image sensor used in some input devices 104 may have more or fewer rows. Each row comprises a plurality of pixels.

The rolling shutter of the visible light camera 106 may comprise an electronic rolling shutter or a mechanical rolling shutter. For example, an electronic rolling shutter comprises progressive readout of different rows of pixels in the image sensor as time progresses, each row corresponding to a different portion of the incident light from the FOV 110. In another example, a mechanical rolling shutter may comprise a moving shutter with a slit that moves across the imaging sensor during image acquisition, limiting exposure of incident light from the FOV 110 onto the imaging sensor to particular rows at a given time.

The image acquisition module 182 may coordinate operation of the light sources 180 and the cameras to acquire input image data 112. For example, based on a trigger signal indicative of a start of scan of the rolling shutter of a given camera, and based on the light sequence data 184, the light banks 250 of light sources 180 may be operated in the desired sequence.

As shown here, during operation of the visible light camera 106, the rolling shutter of the visible light camera 106 progresses over time to start with exposing row 0 and proceeds to exposing row 1000. Meanwhile, the light banks 250(1)-(5) operate in a coordinated fashion, illuminating the FOV 110 corresponding to the portion of the image on the image sensor that is exposed by the rolling shutter.

As shown at 350, corresponding first modality image data 114 is acquired.

Infrared camera rolling shutter 332 timing depicts operation of a rolling shutter of the infrared camera 108. Depicted are the rows 0 to 1000 for an image sensor of the infrared camera 108. The image sensor is depicted with 1000 rows for ease of illustration and not as a limitation. For example, the image sensor used in some input devices 104 may have more or fewer rows. Each row comprises a plurality of pixels.

As described above, the image acquisition module 182 may coordinate operation of the light sources 180 and the cameras to acquire input image data 112. For example, based on a trigger signal indicative of a start of scan of the rolling shutter of a given camera, and based on the light sequence data 184, the light banks 250 of light sources 180 may be operated in the desired sequence.

As shown here, during operation of the infrared camera 108, the rolling shutter of the infrared camera 108 progresses over time to start with exposing row 0 and proceeds to exposing row 1000. Meanwhile, the light banks 250(6)-(10) operate according to the specified sequence, illuminating the FOV 110 corresponding to the portion of the image on the image sensor that is exposed by the rolling shutter.

As shown at 350, corresponding second modality image data 116 is acquired.

In other implementations the light sequence data 184 may specify a non-progressive order. A non-progressive order may comprise an order in which non-adjacent light banks 250 are operated at successive times. This is discussed in more detail with regard to FIG. 5. A non-progressive order may include skipping (not using) some light banks 250 while increasing an index value associated with the light banks 250. For example, the non-progressive order 250(1), 250(3), 250(5) skips light banks 250(2) and 250(4). A non-progressive order may include an order in which the index value associated with the light banks 250 is arbitrary. For example, an arbitrary non-progressive order may comprise 250 (5), 250(1), 250(4), and 250(2).

Figure 4:
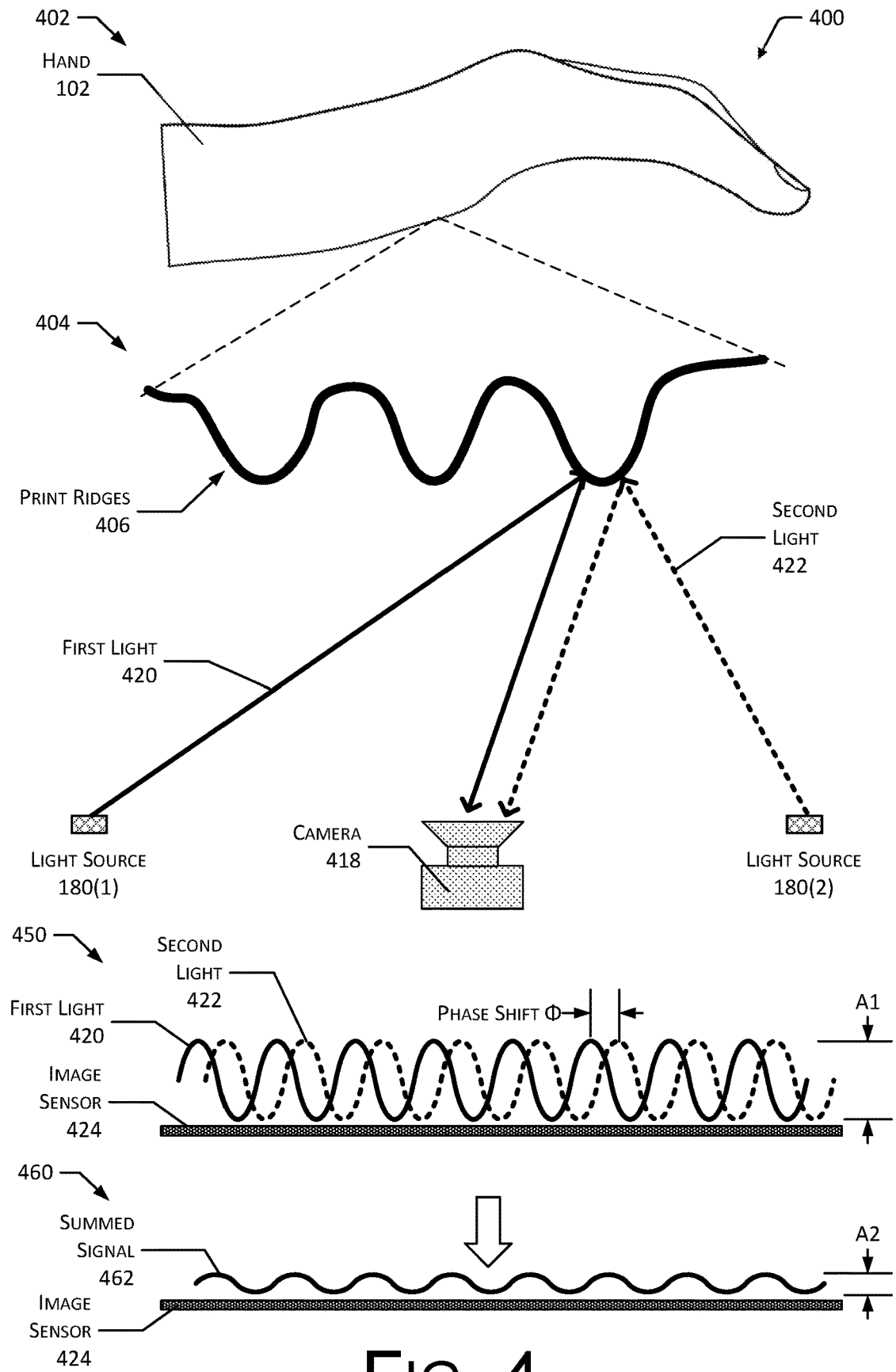
FIG. 4 illustrates a phase shift and resulting interference at an image sensor of a camera that results in decreased contrast in reflectance imaging, according to some implementations.

FIG. 4 illustrates at 400 a phase shift and resulting interference at an image sensor of a camera that results in decreased contrast in reflectance imaging, according to some implementations.

At 402 a side of the hand 102 is depicted, illuminated by a first light source 180(1) at a first end and a second light source 180(2) at a second end, with a camera 418 in between. The camera 418 may comprise one of the visible light camera 106 or the infrared camera 108, and the light sources 180 may comprise visible light sources 234 or infrared light sources 232, respectively.

At 404 an enlarged portion of the hand 102 is shown, depicting a plurality of print ridges 406, also known a friction ridges on the surface of the hand 102.

First light 420 is emitted from the first light source 180(1), impinges on a print ridge 406, and a portion of that first light 420 is reflected back toward the camera 418. Second light 422 is emitted from the second light source 180(2), impinges on the print ridge 406, and a portion of that second light 422 is reflected back toward the camera 418.

At 450 a first phase diagram is shown depicting the apparent phase of the incident light on an image sensor 424, or portion thereof such as a photosensitive pixel. In this illustration, the amplitude "A1" of the first light 420 and the second light 422 impinging on the image sensor 424 are approximately equal. The phase of the first light 420 and the second light 422 are offset by a non-zero phase shift $\Phi$.

In the event that the first light source 180(1) and the second light source 180(2) are operating simultaneously, such as shown here, the resulting interference between the first light 420 and the second light 422, or the signals produced in the image sensor 424 thereby, as shown at 460 results in a summed signal 462. The resulting amplitude of the summed signal 462 is amplitude A2, which is less than A1.

One result of the effect illustrated here is a substantial reduction in contrast when an object in the FOV 110, such as the hand 102, is simultaneously illuminated compared to the time delayed coordinated illumination described here. For example, if illuminated using a single light source 180, such as the first light source 180(1) while the second light source 180(2) is inoperative, the amplitude A1 is substantially greater than the summed signal 462 amplitude A2.

With regard to simultaneous illumination, the greatly different angles-of-incidence (AOI) of the light from the various light sources 180 that are subtended by the hand 102 result in the reduction in contrast. This results from the different AOI from the different light sources 180. This is similar to parallax, in which image formation is displaced from different viewing angles. AOI differences of ±20 degrees may result in this reduction in contrast. By using the image acquisition module 182 as described herein to illuminate the hand 102 in coordination with the exposure of the image sensor 424 by the rolling shutter, well illuminated and higher contrast image data is acquired, compared to simultaneous illumination.

Figure 5:
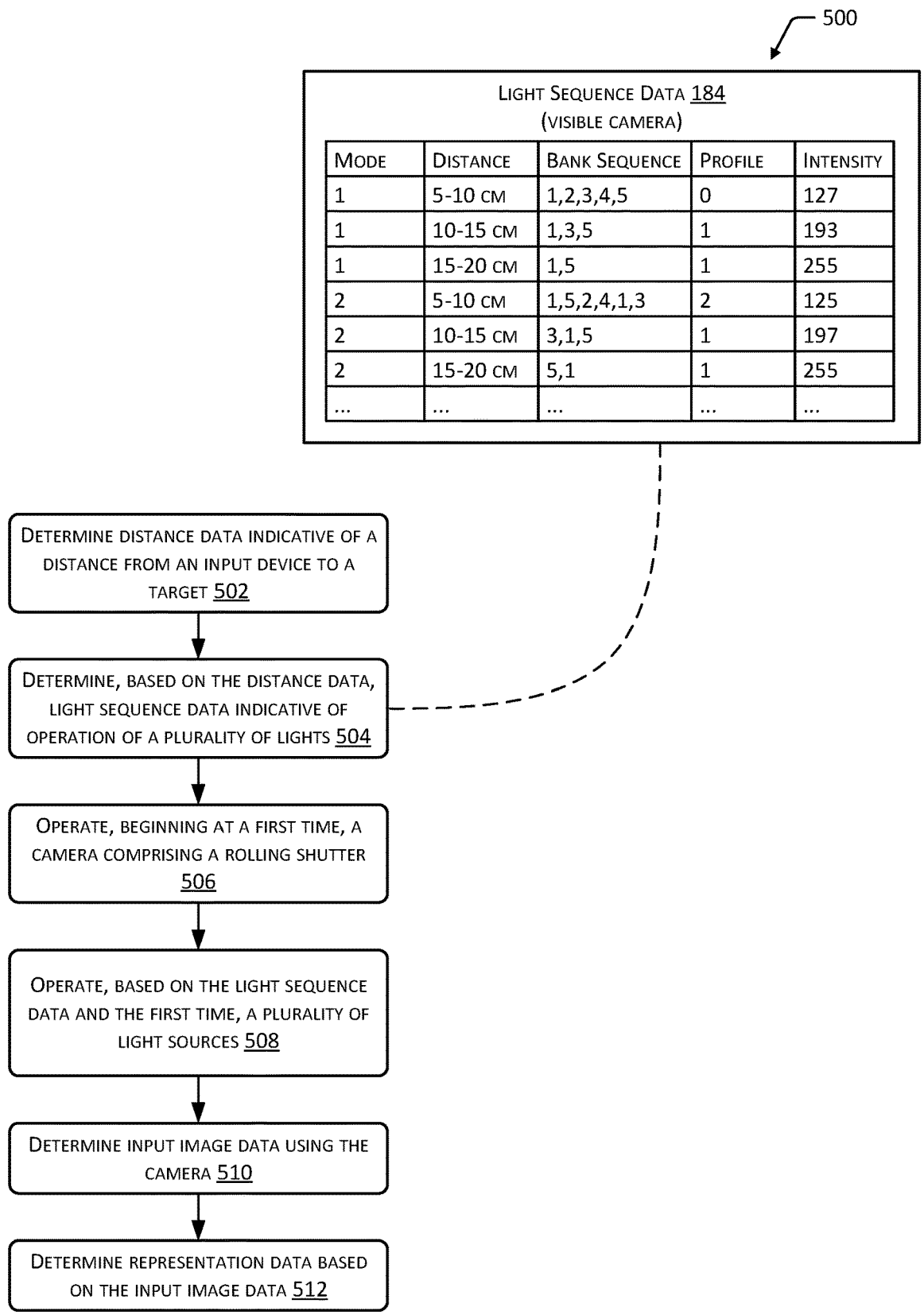
FIG. 5 is a flow diagram of a process to coordinate illumination and acquire input image data, according to some implementations.

FIG. 5 is a flow diagram 500 of a process to coordinate illumination and acquire input image data 112, according to some implementations. The process may be implemented by the image acquisition module 182 executing on a computing device 190(1) of the input device 104. For example, a processor, microcontroller, or other circuitry may provide the time delayed coordinated illumination during image acquisition using a camera with a rolling shutter.

In some implementations, at 502 distance data indicative of a distance from the input device 104, or a portion thereof, to a target is determined. For example, a distance sensor 616(3) may be used to determine the distance data from the input device 104 to the hand 102. In other implementations, the process may omit steps 502 and 504.

At 504, based at least in part on the distance data, light sequence data 184 is determined. The light sequence data 184 is indicative of a sequence of operation of a plurality of light sources 180, or light banks 250 thereof. The light sequence data 184 may comprise various parameters such as operating modes, specified ranges of distance, bank sequence, profile values, intensity values, and so forth.

Different operating modes may be specified. For example, a first operating mode may be associated with acquiring first modality image data 114, a second operating mode may be associated with acquiring second modality image data 116, a third operating mode may be associated with providing a particular lighting effect during image acquisition, and so forth.

The light sequence data 184 may specify a bank sequence. The bank sequence indicates an order of operation, during image acquisition, of the light banks 250 of light sources 180. The bank sequence may specify a progressive order of operation in which adjacent light banks 250 are operated at successive times, or a non-progressive order in which non-adjacent light banks 250 are operated at successive times. For example, the sequence described with regard to FIG. 3 in which light banks 250(1), 250(2), 250(3), and so on are operated is a progressive order of operation. In another example, operating light banks 250 with the sequence of 250(1), 250(3), 250(5) may be described as a non-progressive order in which an index value associated with the light banks 250 is increasing. In still another example, operating light banks 250 with the sequence of 250(5), 250(1), 250(3) may be described as a non-progressive order in which the index value associated with the light banks 250 is arbitrary and may increase or decrease at successive times.

In some implementations the bank sequence may include duration data, indicative of how long a given light bank 250 is to be operated. In other implementations, the duration for each light bank 250 indicated in the bank sequence to operate may be evenly divided across a total exposure time indicative of the time for the rolling shutter to expose all rows of the image sensor 424. For example, if the image sensor 424 acquires a complete image in 16 milliseconds (1,600 microseconds), and assuming only one light bank 250 is operational at a time such as shown in FIG. 3, and there are five banks used, then each light bank 250 may be operated for 320 microseconds.

Different bank sequences may be specified for different distances. This may be done to accommodate the different light patterns 262 and the corresponding portion of the hand 102 that they subtend at different distances. For example, at a relatively close distance, each light bank 250 may be used in sequence to provide even illumination across the hand 102 due to the relatively small portion of the light pattern 262 that subtends the hand 102 due to the distance. In comparison, at larger distances some light banks 250 may be skipped as the light patterns 262 at that larger distance subtend larger portions of the hand 102. This is discussed in more detail with regard to FIG. 6.

The light sequence data 184 may specify one or more profile parameters. The profile parameters may specify a start or leading edge profile for beginning illumination, a trailing edge profile for ending illumination, and so forth. For example, a start profile value is indicative of intensity changes over time during which intensity increases from zero to a specified or maximum intensity. This may be a linear, non-linear, or stepwise change in intensity over time. In another example, an end profile value is indicative of intensity changes over time during which intensity decreases from the specified or maximum intensity to zero. This may be a linear, non-linear, or stepwise change in intensity over time. In some implementations the start profile used to operate a light bank 250 may differ from the end profile. For example, the start profile may specify a linear increase in intensity over time while the end profile may specify a non-linear decrease of intensity over time. In some implementations, a different profile value may be specified for each light bank 250 indicated in the bank sequence.

In some implementations, the light sequence data 184 may be used to operate one or more light banks 250 such that the profiles of changes in illumination over time are respectively ramped up or down to provide a relatively smoothly progressing band of illumination in the direction of the rolling shutter scan direction 242. For example, the light sequence data 184 may be used to operate the light banks 250 such that intensity of emitted light increases over time when activating a light bank 250, ramping up, and the intensity of emitted light decreases over time when deactivating the light bank 250. Continuing the example, while one light bank 250 is ramping up, another light bank 250 may be ramping down.

The light sequence data 184 may specify a maximum intensity value. The maximum intensity value may specify or be associated with a maximum drive current used to operate a light bank 250 while operating to emit light. For example, the intensity value may be specified as an 8 bit value, allowing 256 levels of intensity ranging from 0 (off) to 255 (maximum).

Instead of, or in addition to the distance, in some implementations the light sequence data 184 may be determined based at least in part on zoom data indicative of operation of an optical zoom mechanism. In some implementations one or more of the cameras may include an optical zoom mechanism that allows for a change in focal length of the optics in the camera. For example, a change in zoom may be produced by using an actuator to move a lens toward or away from the image sensor 424. In another example, a variable geometry lens may be used to change zoom. Among other effects, varying the zoom of the camera may result in a change in the size of the FOV 110. Zoom data may be determined that is indicative of operation of the optical zoom mechanism. For example, the zoom data may be determined based on an encoder that reports position of one or more optical elements in the camera, or may be based on commands used to operate one or more actuators of the optical zoom mechanism. Based at least in part on the zoom data, a particular set of light sequence data 184 may be determined for operation.

In some implementations, a combination of distance data and zoom data may be used to specify a particular set of parameters in the light sequence data 184.

The light sequence data 184 is depicted as a table for ease of illustration and not necessarily as a limitation. In other implementations other data structures may be used.

At 506, beginning at a first time, the camera comprising a rolling shutter is operated to acquire input image data 112. For example, the visible light camera 106 or the infrared camera 108 begin image acquisition, with the respective rolling shutter beginning to acquire image data beginning with row 0 and progressing to the final row of the image sensor 424.

At 508, based on the light sequence data 184 and the first time, the plurality of light banks 250 of light sources 180 are operated while the rolling shutter is operating. For example, responsive to an interrupt, start signal, or other data associated with beginning image acquisition, the image acquisition module 182 proceeds to operate the light banks 250 of light sources 180 according to the specified bank sequence, profile parameter, intensity parameter(s), and so forth.

The operations of 506 and 508 may occur during the same interval of time. For example, the light banks 250 are operated, based on the light sequence data 184 such that the first light source 180 is operated from the first time to a second time, the second light source is operated from the second time to a third time, and the third light source is operated from the third time to a fourth time. Meanwhile, using the camera, a first set of rows of image data are acquired from the first time to the second time, a second set of rows of image data are acquired from the second time to the third time, and a third set of rows of image data are acquired from the third time to the fourth time.

At 510 input image data 112 is determined using the camera. For example, the operation of the rolling shutter may conclude and the resulting input image data 112 may be stored.

With the input image data 112 now available, other operations may be performed. For example, the input image data 112 may be assessed for quality such as overall contrast, brightness, blurriness, and so forth. In one implementation, at 512 the input image data 112 is processed by the representation network module(s) 120 to determine representation data 136. The representation data 136 may then be subsequently used for enrollment, comparison, and so forth.

Figure 6:
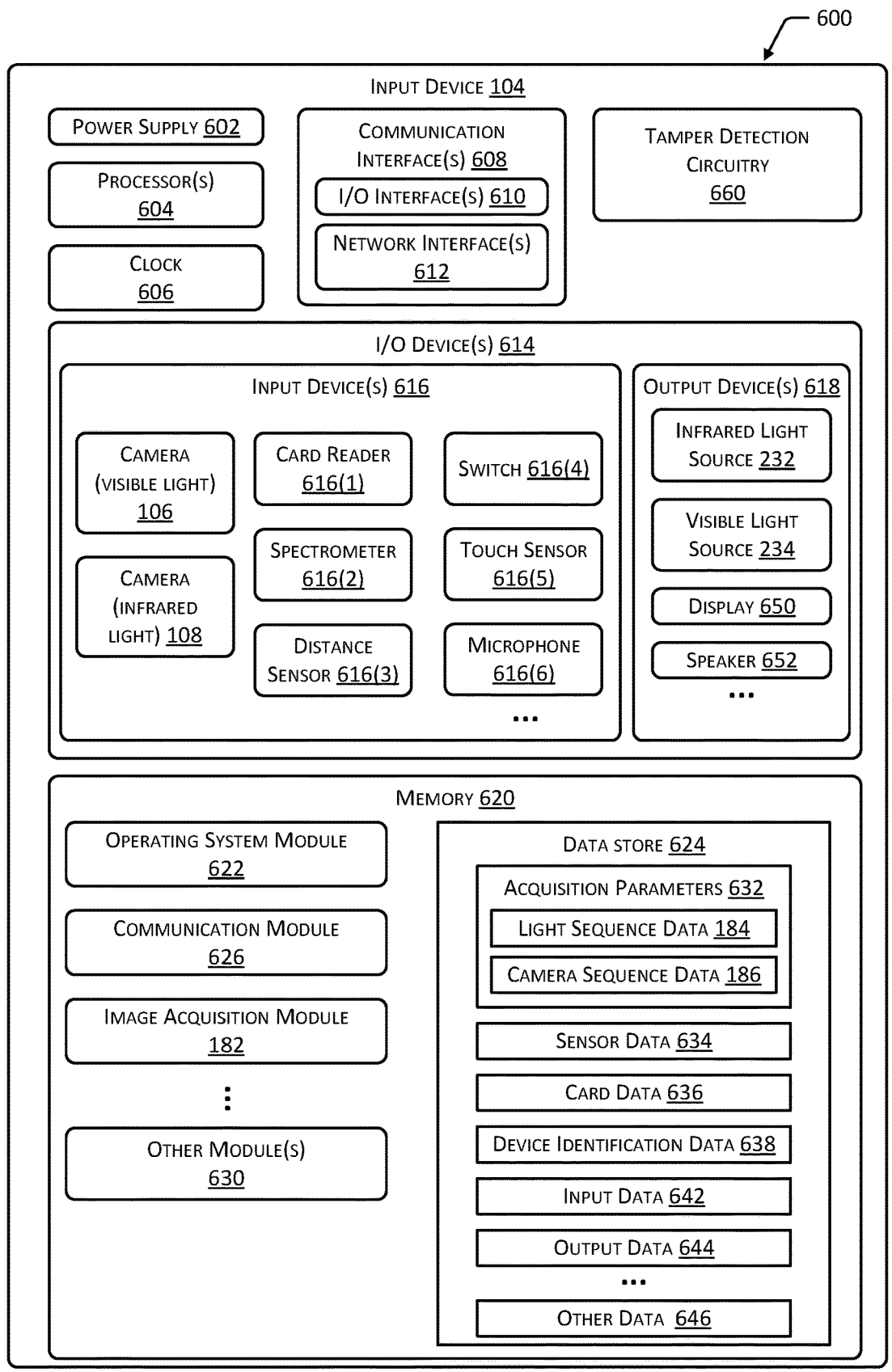
FIG. 6 is a block diagram of the input device, according to some implementations.

FIG. 6 is a block diagram 600 of the input device 104, according to some implementations.

One or more power supplies 602 are configured to provide electrical power suitable for operating the components in the input device 104. In some implementations, the power supply 602 may comprise an external power supply that is supplied by line voltage, rechargeable battery, photovoltaic cell, power conditioning circuitry, wireless power receiver, and so forth.

The input device 104 may include one or more hardware processors 604 (processors) configured to execute one or more stored instructions. The processors 604 may comprise one or more cores. One or more clocks 606 may provide information indicative of date, time, ticks, and so forth. For example, the processor 604 may use data from the clock 606 to generate a timestamp, trigger a preprogrammed action, and so forth.

The input device 104 may include one or more communication interfaces 608 such as input/output (I/O) interfaces 610, network interfaces 612, and so forth. The communication interfaces 608 enable the input device 104, or components thereof, to communicate with other devices or components. The communication interfaces 608 may include one or more I/O interfaces 610. The I/O interfaces 610 may comprise interfaces such as Bluetooth, ZigBee, Inter-Integrated Circuit (I2C), Serial Peripheral Interface bus (SPI), Universal Serial Bus (USB) as promulgated by the USB Implementers Forum, RS-232, and so forth.

The network interfaces 612 are configured to provide communications between the input device 104 and other devices, such as access points, point-of-sale devices, payment terminals, servers, and so forth. The network interfaces 612 may include devices configured to couple to wired or wireless personal area networks (PANs), local area networks (LANs), wide area networks (WANs), and so forth. For example, the network interfaces 612 may include devices compatible with Ethernet, Wi-Fi, 5G, 6G, LTE, and so forth.

The input device 104 may also include one or more buses or other internal communications hardware or software that allow for the transfer of data between the various modules and components of the input device 104. For example, the input device 104 may use one or more Universal Serial Bus interfaces.

The input device 104 may include tamper detection circuitry 660. In one implementation, the tamper detection circuitry 660 may comprise a trusted platform module (TPM). The TPM may comprise a dedicated processor that is also powered independently of the power supply 602. For example, the TPM may be powered by a battery. The tamper detection circuitry 660 may be connected to, or receive information about the status of, one or more tamper detection devices. For example, the tamper detection circuitry 660 may be connected to a tamper mesh, one or more tamper detection switches, and so forth. If the tamper detection circuitry 660 detects a tamper event, mitigating actions including, but not limited to memory erasure, self-destruction, and so forth may be performed. For example, if the tamper detection circuitry 660 detects a break in a tamper detection cover, the cryptographic keys stored within the memory 620 may be erased.

The tamper detection circuitry 660 may store data indicative of an order of occurrence of a plurality of tamper events. For example, a first change indicative of the tamper mesh being broken at a first time may be determined. Continuing the example, a second change indicative of the tamper mesh being broken at a second time after the first time may then be determined. The tamper detection circuitry 660 may store data indicative of the order of occurrence, indicating that the first change occurred before the second change. In some implementations, mitigating actions may be determined based on the order of occurrence. For example, a first order of occurrences of tamper events may result in a first action, while a second order of occurrences of tamper events may result in a second action.

The I/O interface(s) 610 may couple to one or more I/O devices 614. The I/O devices 614 may include input devices 616 and output devices 618. The input devices 616 may acquire sensor data 634 during operation.

The input devices 616 may comprise the visible light camera 106 comprising an image sensor that is sensitive to visible light. The visible light camera 106 may utilize a rolling shutter.

The input devices 616 may comprise the infrared camera 108 comprising an image sensor 424 that is sensitive to infrared light. The infrared camera 108 may utilize a rolling shutter.

The input devices 616 may include one or more of a card reader 616(1), a spectrometer 616(2), a distance sensor 616(3), a switch 616(4), a touch sensor 616(5), a microphone 616(6), and so forth.

The card reader 616(1) may comprise a contactless card reader, EMV card reader, optical card reader, and so forth. For example, the card reader 616(1) may comprise a near field communication (NFC) wireless interface and associated circuitry to communicate with a contactless card device.

The spectrometer 616(2) may be used to assess light that is emitted from the light sources 180 and reflected predominately from a surface of the object, or from deeper within the object. In some implementations, the relative intensity of the reflectance at different wavelengths as determined by the spectrometer 616(2) may be used to determine if the object within the FOV 110 is an actual hand or an artificial construct.

The spectrometer 616(2) may comprise a multichannel device, with each channel associated with a particular wavelength or range of wavelengths. The spectrometer 616(2) may be capable of integrating intensity data for a plurality of different channels during the same time interval. For example, the spectrometer 616(2) may determine intensity data for six channels during the same time interval. The spectrometer 616(2) may comprise a single-chip device that provides spectroscopic intensity data as output. For example, the spectrometer 616(2) may comprise the AS7341L "10-channel Spectral Sensor Frontend" produced by ams AG of Austria. In other implementations, the spectrometer 616(2) may utilize a plurality of detectors or other devices that are sensitive to particular wavelengths. For example, a first channel may comprise a photodiode sensitive to 415 nm light and not other wavelengths such as 445 nm.

The distance sensor 616(3) may comprise an optical time-of-flight sensor, radar, passive infrared sensor, or other device. The distance sensor 616(3) provides distance data indicative of a distance between the distance sensor 616(3) and an object within the FOV 110.

In some implementations, operation of the image acquisition module 182 may be based at least in part on distance data acquired by the distance sensor 616(3). In one implementation, brightness of the emitted light from the one or more light sources 180 may be based on distance data provided by the distance sensor 616(3) that is indicative of distance between an object and the distance sensor 616(3). For example, brightness level may be determined based on the distance data. The one or more light sources 180 are then operated according to the brightness level. As the distance increases, the brightness level and corresponding brightness of the one or more light sources 180 may be increased. An increase in brightness results in increased emission of photons per unit of time. By controlling the brightness of the one or more light sources 180 (or other light sources), a particular optical power per unit area of the object may be obtained. By obtaining a particular optical power per unit area of the object, and dynamically adjusting the brightness to account for variations in distance, the overall image quality of the input image data 112 is improved, improving the operation of the comparison module 160.

In one implementation, light sequence data 184 used to operate the one or more light sources 180 may be based on distance data provided by the distance sensor 616(3) that is indicative of distance between an object and the distance sensor 616(3). As the distance changes the order, duration, and other aspects of operation of the light banks 250 of light sources 180 may vary. For example, at close distances less than a threshold distance, some light banks 250 of light sources 180 may be skipped and remain unilluminated. At greater distances beyond the threshold distance additional light banks 250 of light sources 180 may be illuminated. By controlling the light sequence used to operate the light banks 250 of light sources 180 based on the distance, the image acquisition module 182 results in the cameras providing input image data 112 with suitable quality. As a result, operation of the comparison module 160 is improved.

Other distance sensors 616(3) may be employed by the input device 104. For example, a second distance sensor 616(3) may be positioned on the input device 104 to detect the presence of an object outside of the FOV 110 as well. For example, the second distance sensor 616(3) may be arranged to detect a user as they approach the input device 104. Responsive to this detection, the input device 104 may present information on the display 650, operate the light sources 180, operate the camera, and so forth.

The switch 616(4) is configured to accept input from the user. The switch 616(4) may comprise mechanical, capacitive, optical, or other mechanisms. For example, the switch 616(4) may comprise mechanical switches configured to accept an applied force from a user's finger press to generate an input signal.

The touch sensor 616(5) may use resistive, capacitive, surface capacitance, projected capacitance, mutual capacitance, optical, Interpolating Force-Sensitive Resistance (IFSR), or other mechanisms to determine the position of a touch or near-touch of the user. For example, the IFSR may comprise a material configured to change electrical resistance responsive to an applied force. The location within the material of that change in electrical resistance may indicate the position of the touch. For example, the touch sensor 616(5) may be integrated with the display 650 to provide a touchscreen.

The microphone 616(6) may be configured to acquire information about sound present in the environment. In some implementations, a plurality of microphones 616(6) may be used to form a microphone array. The microphone array may implement beamforming techniques to provide for directionality of gain. For example, the gain may be directed towards the expected location of the user during operation of the input device 104.

Output devices 618 may include one or more of the visible light sources 234, the infrared light source 232, a display 650, a speaker 652, printer, haptic output device, or other devices. For example, the display 650 may be used to provide information via a graphical user interface to the user. In another example, a printer may be used to print a receipt.

In some embodiments, the I/O devices 614 may be physically incorporated with the input device 104 or may be externally placed.

The input device 104 may include one or more memories 620. The memory 620 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 620 provides storage of computer-readable instructions, data structures, program modules, and other data for the operation of the input device 104. A few example functional modules are shown stored in the memory 620, although the same functionality may alternatively be implemented in hardware, firmware, or as a system on a chip (SOC).

The memory 620 may include at least one operating system (OS) module 622. The OS module 622 is configured to manage hardware resource devices such as the I/O interfaces 610, the network interfaces 612, the I/O devices 614, and provide various services to applications or modules executing on the processors 604. The OS module 622 may implement a variant of the FreeBSD operating system as promulgated by the FreeBSD Project; other UNIX or UNIX-like operating system; a variation of the Linux operating system as promulgated by Linus Torvalds; the Windows operating system from Microsoft Corporation of Redmond, Washington, USA; the Android operating system from Google Corporation of Mountain View, California, USA; the iOS operating system from Apple Corporation of Cupertino, California, USA; or other operating systems.

A data store 624 and one or more modules may be stored in the memory 620. These modules may be executed as foreground applications, background tasks, daemons, and so forth. The modules may include one or more of a communication module 626, image acquisition module 182, or other modules 630. The data store 624 may use a flat file, database, linked list, tree, executable code, script, or other data structure to store information. In some implementations, the data store 624 or a portion of the data store 624 may be distributed across one or more other devices.

A communication module 626 may be configured to establish communications with one or more other devices. The communications may be authenticated, encrypted, and so forth. The communication module 626 may also control the communication interfaces 608.

The image acquisition module 182 is configured to acquire data from the input devices 616 and operate the output devices 168 such as the light sources 180. One or more acquisition parameters 632 may be stored in the memory 620. The acquisition parameters 632 may include one or more of the light sequence data 184 or the camera sequence data 186. The acquisition parameters 632 may also specify other parameters such as data sample rate, sample frequency, scheduling, and so forth. The image acquisition module 182 may be configured to operate the distance sensor 616(3), the visible light camera 106, the infrared camera 108, the spectrometer 616(2), the light sources 180, and so forth.

The sensor data 634 may be sent to another device, processed by the processor 604, and so forth. For example, in one implementation the sensor data 634 may be processed to determine one or more features present in the image data acquired by the IR camera 108. Data indicative of the features may be encrypted and sent to an external device, such as a server. In the event of a tamper event detected by the tamper detection circuitry 660, the sensor data 634 may be erased.

During operation, the input device 104 may obtain data from other input devices 616. For example, card data 636 may be obtained from the card reader 616(1). The card data 636 may comprise encrypted data provided by a processor of the card reader 616(1). In the event of a tamper event detected by the tamper detection circuitry 660, the card data 636 may be erased.

Device identification data 638 may be stored in the data store 624. The device identification data 638 may provide information that is indicative of the specific input device 104. For example, the device identification data 638 may comprise a cryptographically signed digital signature. In the event of a tamper event detected by the tamper detection circuitry 660, this digital signature may be erased.

The input device 104 may store input data 642 obtained from other sensors. For example, input from a switch 616(4) or touch sensor 616(5) may be used to generate input data 642.

The other modules 630 may include a feature determination module that generates feature vectors that are representative of features present in the image data. The feature determination module may utilize one or more neural networks that accept image data as input and provide one or more feature vectors as output. In some implementations the other modules 630 may include a representation network module 120.

The data store 624 may store output data 644. For example, the output data 644 may comprise the feature vectors generated by processing the image data, representation data 136, and so forth.

The other modules 630 may include a user interface module that provides a user interface using one or more of the I/O devices 614. The user interface module may be used to obtain input from the user, present information to the user, and so forth. For example, the user interface module may accept input from the user via the touch sensor 616(5) and use the visible light source(s) 234 to provide output to the user.

Other data 646 may also be stored in the data store 624.

The devices and techniques described in this disclosure may be used in a variety of settings. For example, the system may be used in conjunction with a point-of-sale (POS) device. The user may present their hand 104 to an input device 104 that is used to obtain biometric data indicative of intent and authorization to pay with an account associated with their identity. In another example, a robot may incorporate an input device 104. The robot may use the input device 104 to obtain biometric data that is then used to determine whether to deliver a parcel to the user, and based on the identification, which parcel to deliver.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A device comprising:
a plurality of banks of light sources, wherein:
each bank comprises a first light source proximate to a first side and a second light source proximate to a second side;
a first bank is proximate to a first end;
a second bank is between the first bank and a third bank; and
the third bank is proximate to a second end;
a camera comprising a rolling shutter;
a memory, storing first computer-executable instructions; and
a hardware processor to execute the first computer-executable instructions to:
determine light sequence data indicative of a sequence of operation of the plurality of banks of light sources;
acquire, using the rolling shutter of the camera:
a first row of image data from a first time to a second time,
a second row of image data from the second time to a third time, and
a third row of image data from the third time to a fourth time; and
operate, based on the light sequence data, the plurality of banks of light sources such that:
the first bank illuminates a first portion of a field-of-view (FOV) that corresponds to the first row of image data from the first time to the second time,
the second bank illuminates a second portion of the FOV corresponding to the second row of image data from the second time to the third time, and
the third bank illuminates a third portion of the FOV corresponding to the third row of image data from the third time to a fourth time.

2. The device of claim 1, wherein the light sequence data is further indicative of one or more of:

an order in which one or more of the plurality of banks of
light sources are operated;
a maximum intensity value to operate the one or more of
the plurality of banks of light sources, or
profile values indicative of intensity changes over time of
the one or more of the plurality of banks of light
sources.

3. The device of claim 1, the hardware processor to further
execute the first computer-executable instructions to:
operate, based on the light sequence data, each bank of the
plurality of banks of light sources such that intensity of
emitted light increases over time when activating a
bank and the intensity of emitted light decreases over
time when deactivating the bank.

4. The device of claim 1, further comprising:
a distance sensor; and
the hardware processor to further execute the first computer-executable instructions to:
determine distance data using the distance sensor,
wherein the distance data is indicative of a distance
to a target; and
determine the light sequence data based on the distance
data.

5. The device of claim 1, further comprising:
an optical zoom mechanism that is optically coupled to
the camera; and
the hardware processor to further execute the first computer-executable instructions to:
determine zoom data indicative of operation of the
optical zoom mechanism; and
determine the light sequence data based on the zoom
data.

6. The device of claim 1, wherein the light sources emit
infrared light and further wherein the camera is sensitive to
the infrared light.

7. A computer-implemented method comprising:
determining, using a first distance sensor, distance data
indicative of a distance between one or more of a
plurality of banks of light sources and a target;
determining light sequence data indicative of a sequence
of operation of the plurality of banks of light sources of
a device, wherein light sequence data is determined
based on the distance data;
operating, beginning at a first time, an image sensor of a
camera to begin scanning to acquire input image data;
and
operating, beginning on or before the first time and based
on the light sequence data, the plurality of banks of
light sources, wherein only a subset of the plurality of
banks of light sources operates during acquisition of the
input image data, and further wherein individual banks
of the plurality of banks of light sources illuminate
different portions of a field of view (FOV) of the
camera.

8. The method of claim 7, wherein the light sequence data
is further indicative of one or more of:
an order in which the one or more of the plurality of banks
of light sources are operated;
a maximum intensity value to operate the one or more of
the plurality of banks of light sources; or
a profile value indicative of intensity changes over time of
the one or more of the plurality of banks of light
sources.

9. The method of claim 7, further comprising:
determining zoom data indicative of operation of an
optical zoom mechanism that is associated with the
camera; and
wherein the light sequence data is further based on the
zoom data.

10. A device comprising:
a camera having a field of view (FOV) extending from a
first end to a second end, the camera comprising an
image sensor that is scanned in a scan direction during
operation to acquire rows of image data, wherein each
row is perpendicular to the scan direction;
a first light source having a first pattern of light emitted
during operation that illuminates a first portion of the
FOV;
a second light source having a second pattern of light
emitted during operation that illuminates a second
portion of the FOV, wherein the second light source is
a first distance from the first light source;
a memory, storing first computer-executable instructions;
and
a hardware processor to execute the first computer-executable instructions to:
determine light sequence data indicative of a sequence
of operation of the first light source and the second
light source;
operate, beginning at a first time, the image sensor to
begin scanning to acquire input image data, wherein
the input image data comprises:
first modality image data acquired using a first
modality and representing first modality features
of a target, and
second modality image data acquired using a second
modality and representing second modality features of the target; and
operate at the first time, based on the light sequence
data, one or more of the first light source or the
second light source.

11. The device of claim 10, wherein the light sequence
data is further indicative of one or more of:
an order in which one or more of the first light source or
the second light source are operated;
a maximum intensity value indicative of a maximum
intensity to operate one or more of the first light source
or the second light source; or
a profile value indicative of intensity changes over time.

12. The device of claim 10, the hardware processor to
further execute the first computer-executable instructions to:
based on the light sequence data, operate one or more of
the first light source or the second light source to
increase intensity of emitted light over time and
decrease the intensity of emitted light over time.

13. The device of claim 10, the hardware processor to
further execute the first computer-executable instructions to:
operate, based on the light sequence data:
the first light source from the first time to a second time,
and
the second light source from the second time to a third
time; and
acquire, using the image sensor:
a first set of rows of the input image data from the first
time to the second time, wherein the first set of rows
correspond to a first portion of the FOV, and
a second set of rows of image data from the second time
to the third time, wherein the second set of rows
correspond to a second portion of the FOV.

14. The device of claim 10, the hardware processor to
further execute the first computer-executable instructions to:
operate, based on the light sequence data:
the first light source from the first time to a second time,
and the second light source from a third time to a fourth time, wherein the third time is after the first time and before the second time.

15. The device of claim 10, further comprising:
a distance sensor; and
the hardware processor to further execute the first computer-executable instructions to:
determine distance data using the distance sensor, wherein the distance data is indicative of a distance to the target in the FOV; and
determine the light sequence data based on the distance data.

16. The device of claim 10, the camera comprising an optical zoom mechanism; and
the hardware processor to further execute the first computer-executable instructions to:
determine zoom data indicative of operation of the optical zoom mechanism; and
determine the light sequence data based on the zoom data.

17. The device of claim 10, further comprising:
a third light source having a third pattern of light emitted during operation that illuminates a third portion of the FOV that is between the first end and the second end, wherein the third light source is between the first light source and the second light source; and
the hardware processor to further execute the first computer-executable instructions to:
operate, based on the light sequence data, the first light source at the first time, the third light source at a second time, and the second light source at a third time.

18. The device of claim 10, wherein the first light source and the second light source emit infrared light and further wherein the image sensor is sensitive to the infrared light.

19. The device of claim 1, wherein the rolling shutter comprises a moving shutter with a slit that moves across the camera while the image data is acquired.

20. The method of claim 7, further comprising:
detecting, using a second distance sensor, presence of a user;
wherein the determining the distance data is performed responsive to detecting the presence of the user.

* * * * *